United States Patent [19]
Young

[11] Patent Number: 5,463,398
[45] Date of Patent: Oct. 31, 1995

[54] METHOD AND APPARATUS FOR MULTIPLE REPLY REJECTION WHEN DECODING TRANSPONDER REPLAY SIGNALS

[75] Inventor: Eddie L. Young, Columbus, Ohio

[73] Assignee: B. F. Goodrich FlightSystems, Inc., Columbus, Ohio

[21] Appl. No.: 153,724

[22] Filed: Nov. 16, 1993

[51] Int. Cl.⁶ .......................... G01S 13/87; G01S 13/76
[52] U.S. Cl. ................... 342/46; 342/30; 342/32; 342/38; 342/39; 342/40
[58] Field of Search ................... 342/30, 32, 37, 342/38, 40, 39, 46

[56] References Cited

U.S. PATENT DOCUMENTS

| | | | |
|---|---|---|---|
| 4,218,679 | 8/1980 | Bohm et al. | 342/47 |
| 4,418,349 | 11/1983 | Hofgen et al. | 342/454 |
| 4,926,184 | 5/1990 | Galati et al. | 342/149 |
| 4,970,518 | 11/1990 | Cole, Jr. | 342/37 |
| 5,077,673 | 12/1991 | Brodegard et al. | 342/32 X |
| 5,107,268 | 4/1992 | Sturm et al. | 342/36 |
| 5,235,336 | 8/1993 | Sturm et al. | 342/30 |
| 5,264,853 | 11/1993 | Sturm et al. | 342/30 |
| 5,280,285 | 1/1994 | Curtis et al. | 342/32 |
| 5,321,406 | 6/1994 | Bishop et al. | 342/32 |
| 5,367,303 | 11/1994 | Waltz | 342/37 |
| 5,387,915 | 2/1995 | Moussa et al. | 342/40 |
| 5,406,288 | 4/1995 | Billaud et al. | 342/37 |

*Primary Examiner*—John B. Sotomayor
*Attorney, Agent, or Firm*—Leonard L. Lewis; William E. Zitelli

[57] ABSTRACT

Apparatus for rejecting multipath reply signals received from a target transponder within a selectable time period, comprising: a top antenna and a bottom antenna to detect reply signals; means for determining an altitude code associated with each reply signal detected by the antennas respectively; means for determining a differential time of arrival (DTA) value for each reply signal detected by the antennas respectively; and processing means for: 1) producing, for each top antenna reply signal, a top antenna target report that includes the altitude code and DTA values; 2) producing for each bottom antenna reply signal, a bottom antenna target report that includes the altitude code and DTA data; and 3) comparing each top antenna report data with corresponding data from each bottom antenna report, and marking out each bottom antenna report that is a multipath reply based on such comparison.

22 Claims, 2 Drawing Sheets

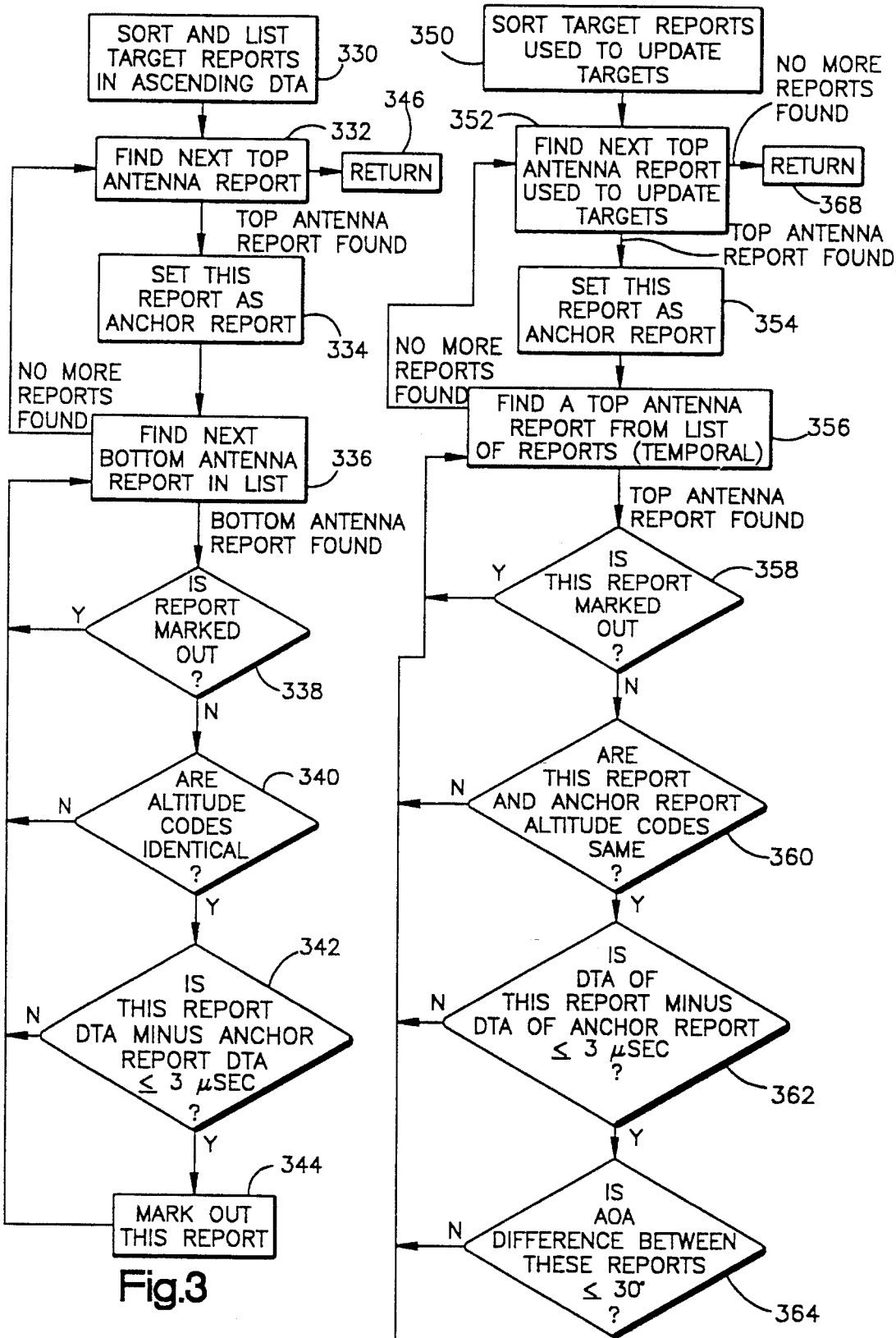

METHOD AND APPARATUS FOR MULTIPLE REPLY REJECTION WHEN DECODING TRANSPONDER REPLAY SIGNALS

BACKGROUND OF THE INVENTION

The invention relates generally to detecting and tracking aircraft using coded reply signals transmitted from aircraft transponders. More specifically, the invention relates to such detecting and tracking under conditions in which multiple and multipath reply signals are received during a receive interval following an interrogation.

Air traffic control and safety are ongoing concerns in commercial and military aviation. Particularly significant concerns are traffic alert and collision avoidance between aircraft either in route between or in the vicinity of landing fields. Ever increasing air traffic demands have resulted in governmental regulations that require commercial carriers to equip planes with active interrogation systems that can determine the presence and threat of nearby aircraft called targets. The particular system mandated by the government depends on the aircraft size. Large commercial aircraft that carry over 30 passengers are being equipped with an active traffic and collision avoidance system (TCAS II) that not only detects and displays nearby aircraft, but also alerts the crew as to impending collisions, and also provides resolution advisories such as audible instructions to the pilot to pull up or down, maintain level or climb rate and so forth. This system, however, is very complex and expensive and therefore has not been mandated for smaller aircraft.

For aircraft that carry up to 30 passengers, governmental regulations require such aircraft be equipped with an active interrogation system (TCAS I) that detects nearby aircraft, determines and displays range, bearing and altitude of such aircraft relative to the interrogating plane, and tracks such aircraft within a prescribed range and issues an audible alert to the crew as to impending collisions. Although the operational performance of the TCAS I system appears less complex than TCAS II, numerous problems arise that make a cost effective system difficult to realize.

The Federal Aviation Administration (FAA) specifies that the TCAS I active interrogation systems use air traffic Control radar beacon system (ATCRBS) signals. These ATCRBS interrogation signals are high frequency pulse amplitude modulated signals at 1030 Megahertz. The reply signals are also pulse amplitude modulated but at a carrier frequency of 1090 Megahertz. In TCAS I, the reply and interrogation signals are transmitted from an interrogation aircraft to other aircraft in the vicinity thereof, and these other aircraft respond to the interrogations via a transponder located on the aircraft.

The interrogation and reply signal waveforms are specified by the FAA. The information contained in the reply signal depends on the type of interrogation (e.g. Mode A, Mode C) and the transponder equipment that the interrogated aircraft has available for responding. For TCAS I, the interrogation mode is Mode C, and the Mode C reply signal from the aircraft transponder consists primarily of encoded altitude data. The altitude data is encoded using binary logic states or bits arranged in four digit octal codes (i.e. each octal altitude code has twelve data bits with each octal digit defined by three data bits). The reply signal data bits are transmitted within a pair of framing pulses called bracket pulses that indicate (for purposes of TCAS I) the beginning and end of an altitude code reply signal from a particular aircraft responding to an interrogation.

A TCAS I system is specified based on the use of these ATCRBS Mode C reply signal waveforms. Thus, an interrogating aircraft may transmit an interrogation signal at 1030 MHz, and then will "listen" for Mode C reply signals from all aircraft capable of responding by transmitting the bracket pulses and altitude encoded data pulses. Some aircraft are not equipped to reply with altitude data (non-altitude reporting, or NAR) and hence only transmit the bracket pulses. Under TCAS I, aircraft within a range of about 34 nautical miles will reply to a Mode C interrogation.

A significant problem that is present during the time that an interrogating aircraft is "listening" for replies, is the occurrence of multipath replies. When a target (responding) aircraft transmits a reply signal, the signal is transmitted substantially omnidirectionally. In addition to the direct transmission path between the target aircraft and the interrogating aircraft, there can be indirect paths that the reply signal can follow back to the interrogating aircraft. For example, the reply signal may be reflected from the Earth's surface (ground or water), or mountains, large buildings and so on. This results in the interrogating aircraft apparently receiving more than one reply signal from the same target. These additional replies must be adequately identified so that they are not misinterpreted as new targets to be tracked, or misinterpreted to provide inaccurate range, bearing and altitude information of the real or true target.

The presence of redundant and false reply signals also will tend to slow down the signal processing used to develop the data needed for target acquisition and tracking, because each reply signal must be analyzed to determine if it represents data from a target that could be a threat to the interrogating aircraft.

In addition to multipath replies, interrogating aircraft with TCAS I systems use an interrogation sequence called a "whisper/shout" sequence. The basic concept for using whisper/shout is to try to reduce the number of aircraft responding at the same time to an interrogation. Accordingly, the interrogation sequence is controlled so that close-in targets will respond first, then farther targets will respond. This is basically accomplished by limiting the signal strength of the initial interrogations so that only nearby aircraft will "hear" the interrogation and respond thereto. However, a target may still reply more than once an interrogation sequence.

Although the whisper/shout sequence can help reduce the number of targets responding at the same time, under the TCAS I specification the number of reply signals received can still be excessive, particularly in high traffic areas.

The objective exists, therefore, for a traffic alert and collision avoidance system that can identify and reject multiple reply signals, particularly reply signals received from indirect multipath reception.

SUMMARY OF THE INVENTION

In view of the aforementioned objectives, the invention contemplates, in one embodiment, apparatus for rejecting multiple reply signals received from a target transponder within a selectable time period comprising:

means for determining an altitude code for each reply signal;

means for determining a differential time of arrival (DTA) value for each reply signal; and processing means for identifying multiple reply signals based on a comparison of the altitude code and DTA data for each reply signal with respect to each other reply signal.

The invention also contemplates the methods embodied in the use of such apparatus, as well as a method for rejecting multiple reply signals received from a target transponder within a selectable time period, comprising the steps of:

a. determining an altitude code associated with each reply signal;

b. determining a differential time of arrival (DTA) value for each reply signal;

c. producing a target report for each reply signal which report includes the altitude code and DTA value; and d. comparing the altitude code and DTA value of each target report for matching, within defined limits, corresponding data of each other target report, and marking out target reports that are multiple replies from the same target based on the comparisons.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 3 is a flow diagram of a multiple reply signal rejection process according to the invention; and FIG. 4 is a flow diagram of a multipath rejection process according to the invention.

DETAILED DESCRIPTION OF THE INVENTION

Figure 1:
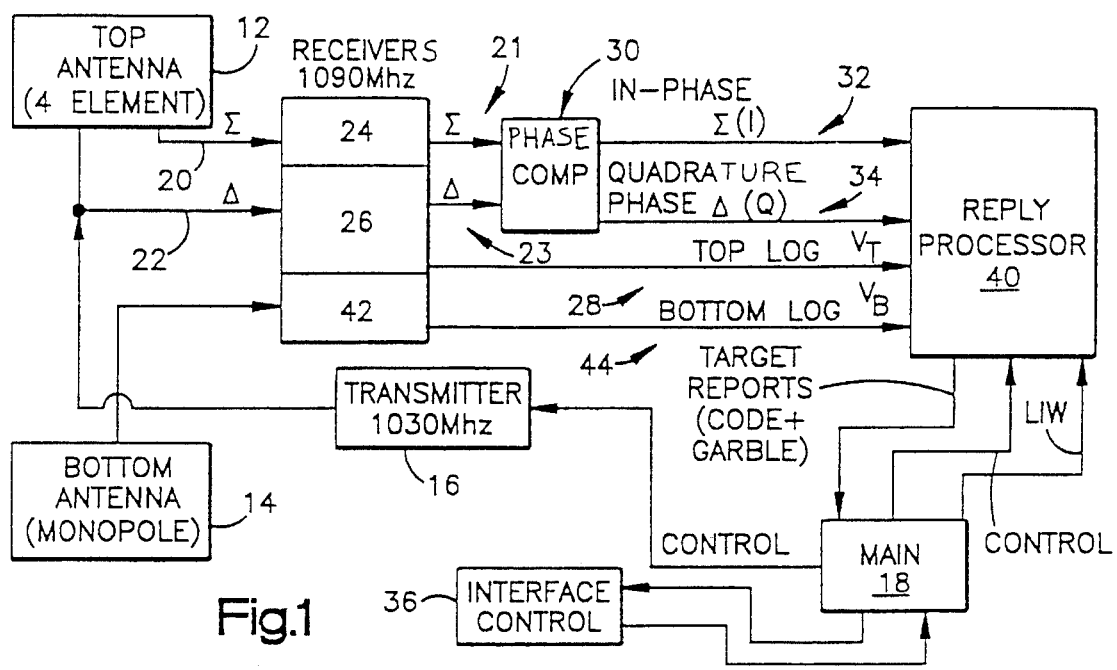
FIG. 1 is system level functional block diagram of a traffic alert and collision avoidance system according to the present invention.

With reference to FIG. 1, an interrogation and reply decoding system for aircraft is shown in system level functional block diagram form and generally indicated with the numeral 10.

Although the invention is described herein with particular reference to an embodiment in an active interrogation system that conforms to the traffic alert and collision avoidance system (TCAS I), such description should not be construed in a limiting sense. Various aspects of the invention relating to reply signal detection and decoding methods and apparatus can be applied in other applications (including, for example, passive systems) wherein it is necessary to detect and decode transmitted signals that have characteristics or problems similar to detecting the ATCRBS reply signals used in a TCAS I environment. Rather, the invention is more generally directed to apparatus and methods for detecting and rejecting multiple reply signals and multipath reply signals.

The system 10 in this case includes a first or top antenna 12 and a second or bottom antenna 14. The top antenna 12 is used both to transmit interrogation signals from an aircraft in an omnidirectional manner, as well as to receive reply signals from nearby aircraft from any bearing location relative to the interrogating aircraft. The bottom antenna 14 is used only as a non-directional receiving antenna for such reply signals. The top antenna is referred to herein as being a directional antenna because it is used to provide bearing information for aircraft responding to an interrogation (called a target(s) hereinafter). The bottom antenna is referred to herein as a non-directional antenna because it is not used to provide target bearing information. Reply signals can be received by either or both antennas.

In a TCAS I compatible system such as described herein, the system 10 is installed on an aircraft such as a regional airliner or a commuter aircraft that is used to carry thirty passengers or less. The basic function of the system 10 is to transmit Mode C interrogation signals via the top antenna 12 omnidirectionally from the interrogating aircraft. All aircraft that are equipped in a conventional manner with a transponder will detect the interrogation signals and in turn issue a Mode C (if altitude reporting) reply signal that is transmitted omnidirectionally from each responding aircraft.

As previously described herein, the TCAS I Mode C reply signal is a pulse amplitude modulated encoded signal having a waveform specified by the FAA. For purposes of understanding the present invention, a detailed explanation of the reply signal format is not required. Of importance is the understanding that, for each reply signal issued by an altitude reporting aircraft, each reply signal will include the target aircraft's altitude encoded as an octal Gray code comprising 12 data bits. These data bits are determined by a reply processor described herein, and the reply processor issues a target reply report that includes, among other data, the twelve bit altitude code of the target.

In general then, the system 10 is configured to receive and detect the reply signals transmitted from responding targets and to decode the reply signals in order to determine range, bearing and relative altitude of the targets with respect to the interrogating aircraft. The range, bearing and altitude information for each and all replies detected during each interrogation listening period, is passed from the reply processor in the form of an electronic report, to a main processor for target track initiating and update.

As shown in FIG. 1, the system 10 includes a transmitter section 16 which in this case produces a 1030 MHz pulse amplitude modulated drive signal that is coupled to the top antenna 12. The system 10 is configured to use similar 1030 MHz interrogation signals as used in the secondary surveillance radar portion of the ground base air traffic control system. The system 10 interrogation rate, however, is slower than the interrogation rate of the SSR system, and typically is on the order of an interrogation sequence every one or two seconds. Each interrogation sequence may include a multiple number of interrogation transmissions.

The 1030 MHz interrogation signal is transmitted from the top antenna 12. A main processor 18 is programmed so as to control, through appropriate timing logic, when the transmission cycles begin and end for the 1030 MHz transmitter 16.

The top antenna 12 also functions as a directional receiving antenna for providing bearing information. In this case the antenna is preferably a four element or monopole array formed in the shape of a square (not shown). The output of each of these four elements can be combined, summed and subtracted in a conventional manner so as to produce a sum channel 20 and delta channel 22. As is known to those skilled in the art, these sum and delta channel signals have a relative phase relationship with respect to each other that is an indication of the bearing of the aircraft that transmitted the reply signal. The sum and delta channel signals 20,22 are input to respective sum and delta channel receiver sections 24,26. In the described embodiment, the received signals are characterized by a modulated high frequency carrier signal of 1090 MHz and the receiver sections 24,26 are used in a conventional manner to convert the sum and delta channel signals to a lower intermediate frequency (IF) which in this case is about 60 MHz.

The delta channel receiver 26 is also used to produce a log video signal 28 for the top antenna. As is known, the log video signal 28 is an amplitude versus time signal that allows for a determination of the time of arrival of the various pulses that can be received as part of each reply signal. In particular for TCAS I, a pair of bracket pulses (F1 and F2) are transmitted that mark the beginning and end of the reply signal altitude code (i.e. the twelve altitude code data bits are transmitted between the bracket pulses, the latter being spaced apart by approximately 20.3 μsec). The time of arrival (TOA) of the F1 pulse is used as the time marker for a reply signal that is detected and decoded by the reply processor. The time of arrival data of a reply signal directly corresponds to the range of the target that sent the reply signal.

The IF sum and delta channel signals 21,23 are input to a phase comparator 30. The phase comparator 30 may be conventional in design and produces two output signals that are generally referred to as the in-phase and quadrature signals 32,34. Hereinafter the in-phase signal 32 will be represented by a capital letter I and the quadrature phase signal 34 will be represented by the capital letter Q. As is known, the I and Q signals basically represent the sine and cosine components of the relative phase angle (i.e. reply signal bearing) between the sum and delta channel signals. Thus, a calculation of the arc-tangent function of the I and Q signals can be performed to compute the phase angle or bearing of the corresponding received signal. In actual practice, a look-up table can be used to provide the angle information based on the I and Q values so that the arctangent computation can be obviated for unburdening the processing calculations. Use of the look-up table, in conjunction with a preferred calibration method and apparatus, is described in co-pending U.S. patent application Ser. No. 08/153,737, entitled "CALIBRATION METHOD AND APPARATUS FOR RECEIVING TRANSPONDER REPLY SIGNALS", filed on even date herewith, which is commonly owned by the assignee of the present invention, the entire disclosure of which is fully incorporated herein by reference.

The phase angle thus derived from the I and Q signals corresponds to the angle of arrival (AOA) of each of the pulses received as part of a reply signal. It should be noted again that multiple reply signals may be received during a listening period that follows an interrogation transmission by the interrogating aircraft. Each of these reply signals may contain a number of data pulses, and the reply signals and pulses received from different aircraft may overlap in time with each other. The listening period is based on the range from which responding aircraft replies are to be detected, and may be dynamically controlled if desired for a particular application. In the embodiment described herein, a listen in window is opened for up to 400 μsec which corresponds to about 34 nautical miles.

Thus, from the directional top antenna 12, I and Q signals as well as a log video signal are produced for each pulse received by the antenna whether the pulses are data related pulses or bracket pulses. The I and Q signals 32,34 and the log video signal 28 are input to a reply processor 40.

In the embodiment illustrated in FIG. 1, the system 10 further includes the bottom antenna 14 which in this case is a single monopole antenna that does not provide directional or bearing information such as is provided by the top antenna. The bottom antenna is, with respect to the present invention, primarily used as a second source of time and amplitude information for the received reply signals in the event that the signals received by the top antenna are too garbled to permit clean identification, or are not received at all by the top antenna (which can occur, for example, when a target is directly below the interrogating aircraft). The bottom antenna signals, therefore, can be used to maintain a target based on altitude and range information only, for a number of interrogation sequences until the directional information from the top antenna can be reacquired.

Signals received by the bottom antenna 14 are coupled to a bottom antenna receiver 42 which converts the bottom antenna signals to a corresponding log video signal 44 at the video frequency. This bottom antenna log video signal 44 is also input to the reply processor 40, which detects and decodes the bottom antenna reply signals to provide amplitude, altitude code and TOA data for each reply signal.

For purposes of understanding the present invention, it will suffice to understand that a basic function of the reply processor 40 is to analyze the data available for each received pulse in each reply signal detected by both the top and bottom antennas, in order to identify pulses that can be matched together as belonging to a reply signal, and to also then determine the reply signal altitude code. The reply processor 40 performs these functions for all reply signals received during the listening period following an interrogation. For each reply signal detected, the reply processor arranges the corresponding altitude code, reply signal bearing (AOA) data (top antenna reply signals only), and reply signal TOA data into an electronic report hereinafter referred to as a target report, and sends all the target reports to, or are accessed by, the main processor 18 in order to develop target signature initiation and update information. Thus, the main processor 18 can receive target reports for top and bottom antenna detected reply signals— each report is, however, flagged as to which antenna it was received by. The reply processor 40, however, does not determine whether each target report is valid, and may issue multiple reports on the same target, or the target reports could include unwanted reports from multipath reflections.

A detailed description of the reply processor 40 will be found in U.S. Pat. No. 5,387,915 entitled "METHOD AND APPARATUS FOR DETECTING AND DECODING TRANSPONDER REPLY SIGNALS", filed on even date herewith, and commonly owned by the assignee of the present invention, the entire disclosure of which is fully incorporated herein by reference.

After an interrogation signal is transmitted through the top antenna 12 and delta channel 22 by the interrogating aircraft, the main processor 18 sends a listen-in-window (LIW) control signal 48 to the reply processor 40. The LIW signal 48 is used to control the time period following each interrogation in a sequence during which a valid reply signal or signals are permitted to be received and processed. In this case, each listen in window period is open up to about 400 μsec. The LIW signal thereby provides a reference time from which the TOA information can be used to determine differential time of arrival (DTA) for each target. As explained in the referenced co-pending application, the F1 pulse, transmitted by a target as part of a target reply signal, is used to mark the TOA of the reply signal.

Figure 2:
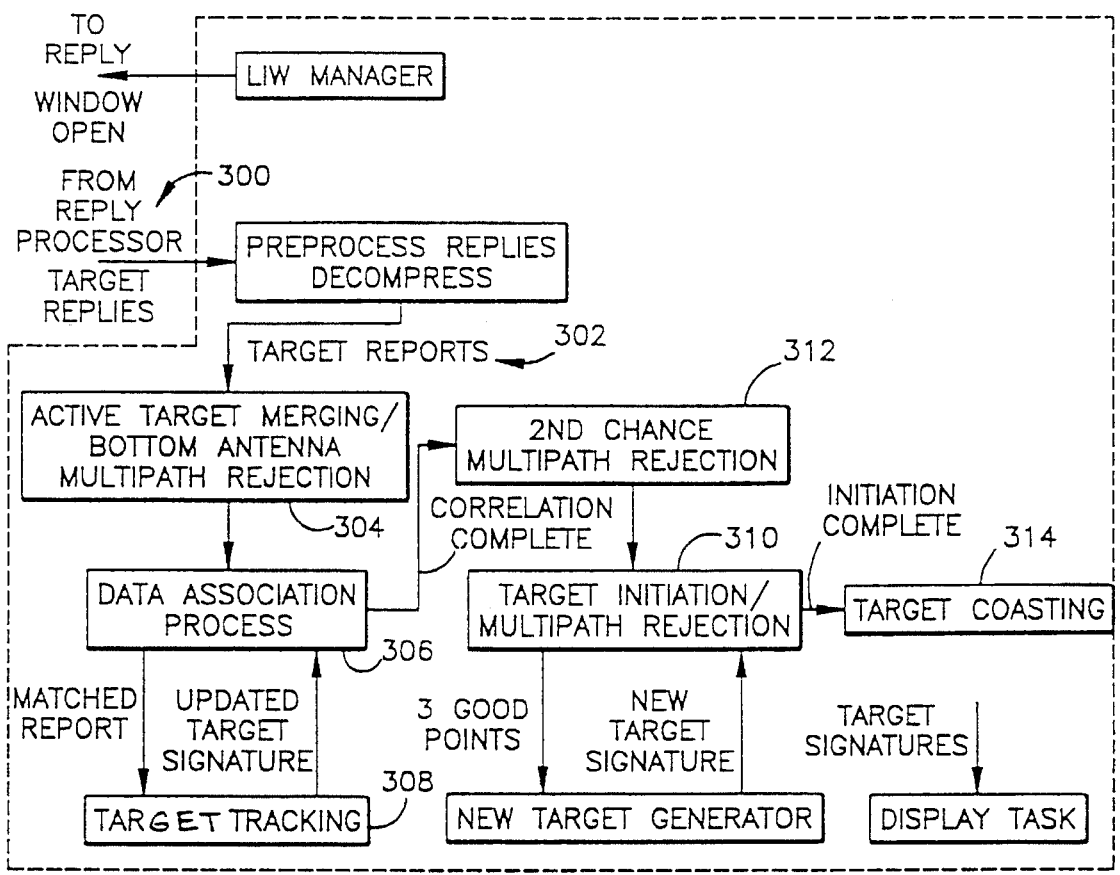
FIG. 2 is a functional block diagram of a main processor circuit suitable for use with the system of FIG. 1 in accordance with the invention.

With reference next to FIG. 2, there is shown a functional block diagram for a main processor suitable for use with the apparatus 10. Functional operation of the main processor 18 with respect to the present invention for multiple reply and multipath reply rejection is primarily realized in the software control program. The hardware implementation of the main processor functions can be realized with the use of a conventional microprocessor, such as device 80960 KB available from Intel, Corp., in combination with the usual support peripheral hardware such as timing circuits, ROM and RAM devices and so on. The microprocessor can be programmed in a conventional manner in accordance with the manufacturer's specifications, to implement the flow diagrams and functions described herein.

The main processor 18 receives the target reports from the reply processor 40 in a data compressed format noted at 300, and expands the input target data into the separate target reports (302) as described hereinabove. The data compression is used primarily to reduce the time required for data transfer between the reply processor 40 and the main processor 18, however, data compression is not required and forms no particular part of the present invention.

It is noted again that each group of target reports that are transferred to the main processor, are all the reports that correspond to the reply signals detected by the reply processor 40 during a single LIW period following an interrogation. The system 10, of course, will process all reports for all LIW periods following interrogations (in this case interrogation sequences are transmitted about every two seconds) throughout normal operation of the system 10.

The target reports 302 are loaded into a memory 304 in the form of a list arranged in temporal order such that the first target report received is first on the list (each target report includes a time of arrival [TOA] data value that corresponds to when the reply signal was received relative to an interrogation). The list is assembled with both top and bottom antenna reports together, simply arranged in order of detection.

This initial listing of all the target reports is analyzed for target report merging and a first pass multipath rejection process. The target report merging process is used to reject multiple target reports. Such multiple reports can derive, for example, from target reply signals received by the interrogating aircraft, for example, because of multiple replies from a single target resulting from the whisper/shout interrogation sequence.

The first pass multipath rejection process, described in greater detail herein with respect to FIG. 3, is used to reject bottom antenna target reports based on a comparison with top antenna target reports. This first pass multipath rejection process is thus directed to finding multipath target reports that likely are the result of multipath reception from indirect travel of the corresponding reply signal from the target to the bottom antenna of the interrogating aircraft, such as from Earth reflection (i.e ground reflected multipath targets are likely to be detected by the bottom antenna). The phrase "first pass" has no particular significance other than to distinguish the multipath process at 304 from the multipath processes at 310 or 312. The reference to "first" pass (or "second" chance as used hereinafter) should not be construed as a requirement that the multipath rejection processes occur in any particular order or time, however, the data flow described herein is preferred.

In general, the target report merging and first pass multipath rejection processes are carried out using the temporal target report list, and marking out (i.e. flagging with a data bit) those target reports determined to be a multiple report or from multipath travel. Any target report marked out (flagged) as multiple or multipath is discarded before the reports are sent on for further processing. Thus, these first pass processes act as a target report filter to try to reduce the number of reports sent on for data association, target tracking and target acquisition.

After the target report merging and first pass multipath rejection processes are complete, the remaining unmarked target reports are sent to a data association process 306, and thereafter for target tracking 308 and target initiation 310 processes. The data association process 306 is primarily used to determine which target reports best match existing target signatures maintained in a target tracking routine 308. The tracking process 308 can be any such process well known to those skilled in the art, such as Kalman filtering, or $\alpha$-$\beta$ filtering, for example. Each target signature is a set of parameters that are obtained from target reports that identify target position and movement. The target tracking, initiation and data association processes 306, 308 and 310 form no particular part of the present invention, other than to the extent that the multiple reply and multipath rely rejection processes are used to facilitate the data association, target tracking and target initiation processes by reducing the number of target reports that need to be analyzed in those processes. The data association process, and target initiation and tracking processes are described in co-pending U.S. patent application Ser. No. 08/153,722 filed on even date herewith, and commonly owned by the assignee of the present invention, the entire disclosure of which is fully incorporated herein by reference.

After the data association process 306 is completed, any target reports not used to update existing target signatures are compared with target reports that were used for such updates, in a second chance (pass) multipath rejection process 312. The second chance multipath rejection process is described in greater detail herein with respect to FIG. 4, and relates to filtering top antenna target reports on the premise that top antenna multipath reports will not typically be rejected by the first pass multipath process and report merging process.

After target initiation and tracking, any target signatures that have not been updated with a measurement from the current surveillance update (i.e. the current interrogation cycle) are coasted at the process designated with the numeral 314. Coasting refers to maintaining a track for a period of time over a number of surveillance updates during which data updates are missed or unavailable for a track. After a predetermined coasting period the target signatures are dropped if not updated.

Target report merging, as part of the first pass process at 304, is performed to consolidate multiple target reports that are generated from one target during an interrogation sequence (top and bottom reports are analyzed in the temporal target report list) to reduce the number of reports passed along to the data association process 306.

First, a list of all target reports is generated and stored according to differential time of arrival (DTA). The reports are listed in ascending order of DTA. A differential time of arrival value for each target report is easily computed based on the TOA data that is referenced to the start of the corresponding LIW period. Thus, the DTA value for each target report is simply a value that represents the temporal order of arrival of the target report's corresponding reply signal following an interrogation.

Starting then with the first such target report, called the anchor report, in the temporal target report list (hereafter "list"), every other report in the list that has not been marked out (i.e. identified as a multiple report) is searched for identifying duplicate reports based on the altitude code, DTA and AOA values (if available). In other words, the altitude code, DTA value and AOA (if available) value for the anchor report is compared respectively with the corresponding data of every other unmarked report in the list. This is done in a sequential manner in the described embodiment because of the temporal order of the list.

The matching criteria for deciding if a duplicate report has been found is as follows in this particular embodiment:

1. Altitude codes of current anchor and each compared report are identical; and
2. DTA values of anchor and each compared report are within 0.75 μsec of each other; and
3. AOA values of anchor and each compared report are within 10° of each other.

These examples of matching criteria are intended to be exemplary and will typically be based on empirical data collected for a particular application.

When any two unmarked reports are found that have data matching according to the above criteria, then one of the reports is marked out and discarded. Which report is marked out depends on which antenna the reports were received by. If the matching reports both came from the top antenna such that AOA data is available for both, then the report that has the smaller DTA value is kept and the other marked out (because the earlier received reply signal is less likely to be multipath or duplicate). If neither of the matching reports has AOA data (i.e. both came from the bottom antenna), the report that has the smaller DTA value is kept and the other report marked out (again because the earlier received reply signal is less likely to be multipath or a duplicate). If one of matching reports has AOA data and the other does not (i.e. one came from the top antenna and the other from the bottom antenna), then the report with the AOA data is kept and the other report is marked out (because reports with bearing information are preferred over reports that do not have bearing data).

After the current anchor report has been compared to all other reports, or marked out, the search continues with the next unmarked target report in order on the list, which next report becomes the new anchor report. This process continues until all reports in the list have been analyzed. This completes the target report merging process.

With reference to FIG. 3, a first pass multipath rejection process is performed to eliminate target reports whose corresponding reply signals were detected by the bottom antenna and that can be matched with a report whose reply signal came from the top antenna. The flow diagram of FIG. 3 shows an exemplary embodiment of such a process.

The premise for the bottom antenna target report rejection based on top antenna target reports is that multipath reply signals typically occur from Earth reflection, and are detected by the bottom antenna later in time (due to longer travel distance) than the correct (direct path) reply signal received by the top antenna.

Although the first pass (bottom antenna) multipath rejection process is described herein in combination with, and in fact following the multiple reply rejection (target report merging) process, those skilled in the art will appreciate that the multipath rejection process can be practiced independently of use of the target report merging process.

The list that was generated for the target report merging process can conveniently be used to perform the multipath rejection process. As with report merging, the search begins with the first unmarked report set as the current anchor report, but in this case the anchor reports are only selected from the top antenna reports. All bottom antenna reports are then searched and compared for matching data. The matching criteria is as follows for this embodiment:

1. Current anchor report and compared report have identical altitude codes; and
2. DTA value of the bottom antenna report is greater than the DTA value of the top antenna report and within 3 μsec thereof.

Thus, at step 330, the list is accessed, and at step 332 the list is searched from the beginning (i.e. smallest DTA report first) for the next unmarked top antenna report. If found, this report is set as the current anchor report at step 334, and at step 336 the next unmarked bottom antenna target report is searched for.

If a bottom antenna report is found at step 336, it is checked at step 338 for being marked out. If marked out the search for another bottom antenna continues at step 336. If the bottom antenna report is not marked out, it's altitude code is compared at step 340 to the anchor report altitude code in accordance with the matching criteria described above. If they do not match within the criteria, the search for another bottom antenna report continues at step 336. If the reports match at step 340 for altitude, at step 342 the DTA values are compared for matching according to the criteria above. If they again match, the bottom antenna target report is marked out at step 344, and the search continues for more matching bottom antenna target reports at step 336. When no more are found, the program loops back to step 332 for the next anchor report from the top antenna, and the process ends at step 346 after all reports have been analyzed.

With reference to FIG. 4, a second chance multipath rejection process is used to reject multipath replies received by the top antenna by comparison with targets reports that were used to update existing target signatures. This second chance multipath process thus follows the data association process 306 (FIG. 2) during which target signatures were updated with current target report information, if any. The premise of the top antenna multipath rejection process is that multipath detected on the top antenna is likely not to be rejected by the target report merging and first pass multipath rejection processes and also will not be rejected by the third multipath rejection process in the target initiation process 310. FIG. 4 shows an exemplary embodiment of such a top antenna multipath process.

An advantage of the second chance multipath rejection process is that it is performed after the data association process 306 during which repaired altitude codes may have been used for target updates. Altitude code repair is a process used during data association, and is described in the referenced co-pending application. Basically, an altitude code can be repaired in some circumstances based on the predicted altitude of the associated target signature. The altitude code used for the second chance multipath process will be the repaired code, if such was used for target update. Cases where the altitude code was repaired are not identified as multipath.

As targets are updated, a second list of target reports used to update target signatures is generated. In actual practice, the update report list can be a sublist contained within the original temporal target report list used during report merging and first pass multipath rejection, by using a flag bit to indicate if the report was used for target signature update. Each report having a repaired altitude code is also flagged.

The second chance multipath process is performed starting from the first report used to update a target signature, and this is flagged as the current anchor report. This anchor report is compared with each unmarked top antenna report not used for target signature update from the temporal target report list. The matching criteria for this embodiment is as follows:

1. Anchor report and compared report altitude codes are identical; and
2. Anchor report and compared report DTA values are within 3 μsec and the update target report occurred earlier in time; and
3. Anchor report and compared report AOA values are within 30° of each other.

As with the previous processes, the search is performed on all unmarked top antenna reports. The matched reports are marked out, and the process continues for all top antenna reports in the lists.

Thus at steps 350 and 352, the next top antenna target report used to update a target is found, and is set as the current anchor report at step 354. At step 356, the temporal target report list is searched for the next top antenna report, and at step 358 it is checked to see if it is marked out. If marked out, the search continues for the next top antenna report.

At step 360, the anchor report and current report are compared for identical altitude codes. If they match, then at step 362, the DTA values are checked if they are within the 3 μsec criteria. If they match, then at step 364 the AOA values are compared, and if they match the report is marked out as multipath at step 366. If any of the comparison tests 358, 360, 362 or 364 fail, then the search continues for the next top antenna report. When no more are found, the next top antenna report used for updating a target signature is found and the process repeats until all reports have been analyzed and the process stops at step 368.

A third multipath rejection process can be used as part of the target initiation process 310 (FIG. 2). This third multipath rejection process may be, for example, a process such as described in RTCA/DO-185 available from the Radio Technical Commission for Aeronatics in Washington, D.C.

The invention thus provides improved multipath and multiple reply signal rejection processes for reducing the amount of reply information needed to be analyzed for establishing and maintaining target tracks.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A method for rejecting multiple reply signals received from a target transponder within a selectable time period, comprising the steps of:

a. determining an angle of arrival (AOA) value for each reply signal using an antenna that produces, in response to said reply signals, phase related signals corresponding to target bearing;

b. determining an altitude code associated with each reply signal;

c. determining a differential time of arrival (DTA) value for each reply signal based on the difference between the time the reply signal was received and a predetermined reference time;

d. producing, for each reply signal, a target report that includes said altitude code, AOA and DTA values; and e. comparing said altitude code, AOA and DTA data of an anchor target report with other target reports for matching, within defined limits, corresponding data of each other target report and said anchor target report to identify matched target reports and marking out such matched target reports as multiple replies from the target corresponding to the anchor target report.

2. The method of claim 1 wherein the step (e.) of comparing said target reports includes the steps of:

i) storing a list of all the target reports in temporal order of DTA; and ii) identifying, as said anchor target report, the earliest target report not marked as a multiple reply, and comparing said anchor target report data with data of each later received target report not marked as a multiple reply;

iii) marking out each multiple target report based on said data comparison; and iv) repeating steps ii) and iii) for the entire list of reports.

3. The method of claim 2 wherein said step of marking out a multiple report by matching report data is based on the following criteria:

1) anchor report altitude code is matched identical to the compared report altitude code; and 2) DTA value of anchor report is matched within a predetermined time difference of the compared report DTA; and 3) AOA value of anchor report is matched within a predetermined angle of the compared report AOA.

4. The method of claim 1 further comprising the step of using a second antenna for detecting said reply signals, said second antenna being non-directional so that AOA information is unavailable from said antenna.

5. The method of claim 4 further comprising the step of producing target reports for reply signals detected by said second antenna, each said second antenna report having DTA and altitude code data for the corresponding reply signal.

6. The method of claim 5 wherein for each step of comparing an anchor report to an other report: if the reports' data match and include AOA values, then the report with the smaller DTA is kept as the best report and the report with the larger DTA is marked out; if the reports' altitude codes and DTA values match but only one report has AOA data, then the report with AOA data is kept as the best report and the report without AOA data is marked out; if the reports' altitude codes and DTA values match but neither report has AOA data, then the report with the smaller DTA is kept as the best report and the report with the larger DTA is marked out.

7. The method of claim 6 wherein said second antenna is a bottom antenna on an aircraft and said first antenna is a top antenna on an aircraft.

8. The method of claim 1 further comprising multipath rejection of bottom antenna reports with said antenna of step (a) being a top antenna, comprising the additional steps of:

f. using a bottom antenna for detecting said reply signals, said bottom antenna being non-directional so that AOA information is unavailable from said antenna;

g. producing target reports for reply signals detected by said bottom antenna, each said bottom antenna report having DTA and altitude code data for the corresponding reply signal; and h. comparing each unmarked report produced from top antenna signals with each unmarked report produced from said bottom antenna signals, and marking out each bottom antenna report that matches a top antenna report based on a predetermined matching criteria for altitude and DTA.

9. The method of claim 8 wherein a bottom antenna report is marked out if its altitude code is an exact match with and its DTA value is greater than, by a predetermined time period, the corresponding altitude code and DTA value of an unmarked top antenna report.

10. The method of claim 9 further comprising multipath rejection of top antenna reports, comprising the steps of:

i. storing a list of unmarked target reports based on said multiple reply and bottom antenna multipath rejection steps;

j. using a number of said unmarked target reports to update target tracking signatures;

k. storing a list of update target reports used to update target signatures; and l. comparing altitude code, AOA and DTA values of each update target report with corresponding data of each unmarked target report, in said list, that were produced from the top antenna; and marking out multipath top antenna reports based on said comparison.

11. The method of claim 10 wherein said top antenna reports are marked out based on matching criteria of:

i) altitude codes exactly match; and ii) DTA values match within a predetermined range; and iii) AOA values match within a predetermined range.

12. A method for rejecting multipath reply signals received from a target transponder within a selectable time period, comprising the steps of:

a. using a top antenna and a bottom antenna to detect reply signals;

b. determining an altitude code associated with each reply signal detected by said antennas;

c. determining a differential time of arrival (DTA) value for each reply signal detected by said antennas;

d. producing, for each top antenna reply signal, a top antenna target report that includes said altitude code and DTA values, and producing for each bottom antenna reply signal, a bottom antenna target report that includes said altitude code and DTA data; and e. comparing each top antenna target report data with corresponding data from each bottom antenna target report, and marking out each bottom antenna target report whose altitude code and DTA value are matched to the corresponding altitude code and DTA value of a top antenna target report based on a predetermined matching criteria.

13. The method of claim 12 wherein said matching criteria for altitude codes is an exact match and for DTA values is for the bottom antenna DTA report value being greater than the DTA value of the top antenna report value, but within a predetermined time period thereof.

14. Apparatus for rejecting multiple reply signals received from a target transponder within a selectable time period, comprising: antenna means for receiving the reply signals and producing phase related signals corresponding to target bearing; means for determining an angle of arrival (AOA) value for each reply signal corresponding to target bearing; means for determining an altitude code associated with each reply signal; means for determining a differential time of arrival (DTA) value for each reply signal based on the difference between the time the reply signal was received and a predetermined reference time; and processing means for: 1) producing, for each reply signal, a target report that includes said altitude code, AOA and DTA values; and 2) comparing said altitude code, AOA and DTA data of an anchor target report with other target reports for matching, within defined limits, corresponding data of each other target report and said anchor target report to identify matched target reports, and marking out such matched target reports as multiple replies from the target corresponding to the anchor target report.

15. The apparatus of claim 14 further comprising memory means for storing a list of all the target reports in temporal order of DTA; said processing means further operating to:

i) identify, as said anchor target report, the earliest target report not marked as a multiple reply, and comparing said anchor target report data with data of each later received target report not marked as a multiple reply;

ii) mark out each multiple target report based on said data comparison; and iii) repeat steps i) and ii) for the entire list of reports.

16. The apparatus of claim 14 wherein said antenna means is disposed on top of an aircraft; said apparatus further comprising bottom antenna means on the aircraft for detecting the reply signals; said processing means producing target reports for reply signals detected by said bottom antenna, each said bottom antenna target report having DTA and altitude code data for its corresponding reply signal; said processing means comparing each unmarked top antenna target report with each unmarked bottom antenna target report, and marking out each bottom antenna target report whose altitude code and DTA value are matched to the corresponding altitude code and DTA value of an unmarked top antenna target report based on a predetermined matching criteria.

17. Apparatus for rejecting multipath reply signals received from a transponder of a mobile target within a selectable time period, comprising: a top antenna and a bottom antenna to detect reply signals; means for determining an altitude code associated with each reply signal detected by said antennas respectively; means for determining a differential time of arrival (DTA) value for each reply signal detected by said antennas respectively; and processing means for: 1) producing, for each top antenna reply signal, a top antenna target report that includes said altitude code and DTA values; 2) producing for each bottom antenna reply signal, a bottom antenna target report that includes said altitude code and DTA data; and 3) comparing each top antenna target report altitude code and DTA data with corresponding altitude code and DTA data from each bottom antenna target report, and marking out each bottom antenna target report that is identified as a multipath reply based on such comparison.

18. The apparatus according to claim 17 wherein a bottom antenna report is marked out if its altitude code is an exact match with, and whose DTA value is greater than, but within a predetermined time period of, the corresponding altitude code and DTA value of a top antenna report.

19. A method for rejecting multiple reply signals received from a transponder of a mobile target within a selectable time period, comprising the steps of:

a. determining an altitude code associated with each reply signal;

b. determining a differential time of arrival (DTA) value for each reply signal;

c. producing a target report for each reply signal which report includes said altitude code and DTA value; and d. comparing said altitude code and DTA value of each target report for matching, within defined limits, corresponding data of each other target report, and marking out target reports that identified as are multiple replies from the mobile target based on said comparisons.

20. The method of claim 19 further comprising the step of determining angle of arrival (AOA) data for each reply signal received by a directional antenna, and using AOA values as a third matching criteria for marking out target reports as multiple replies when two compared reports both have AOA data.

21. Apparatus for rejecting multiple reply signals received from a transponder of a mobile target within a selectable time period comprising:

means for determining an altitude code for each reply signal;

means for determining a differential time of arrival (DTA) value for each reply signal; and processing means for identifying multiple reply signals of said mobile target based on a comparison of said altitude code and DTA data for each reply signal with respect to each other reply signal.

22. A method for rejecting multipath reply signals received from a transponder of a mobile target within a selectable time period, comprising the steps of:

a. using a top and bottom antenna to detect reply signals;

b. determining an altitude code for each reply signal;

c. determining a differential time of arrival (DTA) value for each reply signal; and d. comparing the altitude code and DTA value of reply signals detected by the top antenna to the altitude code and DTA value of reply signals detected by the bottom antenna and identifying multipath bottom antenna detected reply signals based on matching criteria for the corresponding altitude codes and DTA values.

* * * * *